(12) United States Patent
Westerman et al.

(10) Patent No.: US 7,030,861 B1
(45) Date of Patent: Apr. 18, 2006

(54) SYSTEM AND METHOD FOR PACKING MULTI-TOUCH GESTURES ONTO A HAND

(76) Inventors: Wayne Carl Westerman, 3304 Woolen Way, Newark, DE (US) 19711; John G. Elias, 798 Taylors Bridge Rd., Townsend, DE (US) 19734

(*) Notice: Subject to any disclaimer, the term of this patent is extended or adjusted under 35 U.S.C. 154(b) by 209 days.

(21) Appl. No.: 10/065,252

(22) Filed: Sep. 28, 2002

Related U.S. Application Data

(63) Continuation-in-part of application No. 09/681,178, filed on Feb. 10, 2001, now Pat. No. 6,570,557.

(51) Int. Cl.
*G09G 5/00* (2006.01)

(52) U.S. Cl. ........................ 345/173; 345/179

(58) Field of Classification Search ............... 345/168, 345/173, 773, 784; 341/22; 382/126, 159, 382/160, 161, 181; 715/812, 863, 864, 865, 715/866, 773, 784
See application file for complete search history.

(56) References Cited

U.S. PATENT DOCUMENTS

| | | | | |
|---|---|---|---|---|
| 5,178,477 A | * | 1/1993 | Gambaro | 400/489 |
| 5,281,966 A | * | 1/1994 | Walsh | 341/22 |
| 5,483,261 A | * | 1/1996 | Yasutake | 345/173 |
| 5,736,976 A | * | 4/1998 | Cheung | 345/168 |
| 5,764,222 A | * | 6/1998 | Shieh | 345/173 |
| 5,767,842 A | * | 6/1998 | Korth | 345/168 |
| 5,790,104 A | * | 8/1998 | Shieh | 345/173 |
| 5,825,352 A | * | 10/1998 | Bisset et al. | 345/173 |
| 5,933,134 A | * | 8/1999 | Shieh | 345/173 |
| 6,002,808 A | * | 12/1999 | Freeman | 382/288 |
| 6,037,882 A | * | 3/2000 | Levy | 341/20 |
| 6,084,576 A | * | 7/2000 | Leu et al. | 345/168 |
| 6,107,997 A | * | 8/2000 | Ure | 345/173 |
| 6,208,329 B1 | * | 3/2001 | Ballare | 345/173 |
| 6,323,846 B1 | * | 11/2001 | Westerman et al. | 345/173 |
| 6,515,669 B1 | * | 2/2003 | Mohri | 345/474 |
| 6,570,557 B1 | * | 5/2003 | Westerman et al. | 345/173 |
| 6,624,833 B1 | * | 9/2003 | Kumar et al. | 715/863 |
| 6,670,894 B1 | * | 12/2003 | Mehring | 341/22 |
| 6,677,932 B1 | * | 1/2004 | Westerman | 345/173 |
| 6,757,002 B1 | * | 6/2004 | Oross et al. | 345/864 |

\* cited by examiner

*Primary Examiner*—Amr A. Awad
*Assistant Examiner*—Tom Sheng
(74) *Attorney, Agent, or Firm*—Wong, Cabello, Lutsch, Rutherford & Brucculeri, LLP

(57) ABSTRACT

A multi-touch system is disclosed that compares finger arrangements at the beginning of multi-touch gestures and discriminates between neutral- and spread-hand performances. Gestures by the neutral- and spread-hand versions of each chord are then mapped to separate, but intuitively related cursor functions or sets of commands. Less-frequently performed functions and commands are typically assigned to the spread-hand chord, since spreading the hand from neutral takes deliberate effort. With these neutral and spread distinctions, a two-handed gesture set can be packed into a one-handed touch surface, or for two-handed touch surfaces, twice as many intuitively customizable gesture command sets can be accomodated.

14 Claims, 8 Drawing Sheets

SYSTEM AND METHOD FOR PACKING MULTI-TOUCH GESTURES ONTO A HAND

CROSS REFERENCE TO RELATED APPLICATIONS

This application is a continuation-in-part of application Ser. No. 09/681,178, filed Feb. 10, 2001, now U.S. Pat. No. 6,570,557, and assigned to the same assignee as the present invention.

REFERENCED-APPLICATIONS

U.S. Pat. No. 6,323,846 2001 Nov. 27 U.S. Pat. No. 6,142,687 2000 Nov. 07 U.S. Pat. No. 6,057,845 2000 May 02 U.S. Pat. No. 5,642,108 1997 Jun. 24 U.S. Pat. No. 5,367,298 1994 Nov. 22 U.S. Pat. No. 5,336,002 1994 Aug. 09 U.S. Pat. No. 5,288,158 1994 Feb. 2–22 U.S. Pat. No. 5,252,951 1993 Oct. 12.

FIELD OF THE INVENTION

This invention relates to multi-touch input devices, and more particularly to a system and method for packing common computer system commands and function controls into the multi-touch gesture mappings of one hand.

BACKGROUND OF THE INVENTION

Most of the computer systems essential to modern business and leisure activities have evolved a similar core set of graphical user interface commands like Cut, Paste, Save File, and Close File. The commands needed most frequently during personal computer operation can be classified into categories such as mouse cursor manipulation, text cursor manipulation, file management, window management, clipboard/editing operations, and searching. Though individual applications may support specialized commands not available in any other application, almost applications support commands from these core categories. Most of these core commands can be invoked by hotkeys or keyboard shortcuts such as Ctrl+for File Save and Alt+F4 for Exit Application that are fairly standardized across applications and even across diverse operating systems such as Microsoft Windows™ and Linux™ Numerous so-called "macro" programs have been written to allow capture and redirection of hotkey sequences to more specialized operating system functions or applications.

Attempts to speed issuance of hotkeys have led to software that activates command shortcuts in response to particular symbols drawn with the aid of a pen or mouse. Notable examples of such software are Sensiva™ (U.S. Pat. No. 6,057,845 to Dupouy), IBM's Pen for OS/2 (see the User's Guide to Pen for OS/2 Copyright 1995 IBM Corp.), and U.S. Pat. No. 5,252,951 to Tannenbaum et al.

Though users can memorize meaningful pen-drawn alphabets and symbols very easily, simple multi-finger gestures, i.e. slides in a certain direction by certain fingers, are quicker to perform, and if sensibly organized, are also intuitive due to their likeness to motions encountered in everyday tasks. Like hotkey combinations, once performed a few times the command association for multi-finger gestures becomes ingrained in the user's motor memory, and the user subconciously expects those gestures to be available at each computer he or she encounters. Thus careful design of a standard multi-touch gesture set that includes the core command categories in an intuitive manner is critical for user satisfaction in diverse computing environments.

U.S. Pat. No. 5,825,352 to Bisset et al. introduces primitive multi-touch capabilities wherein single-finger motions default to pointing and clicking operations, while addition of a second or third finger can enable drag, scroll, or double-click functions. However, the projective row and column scanning methods of U.S. Pat. No. 5,825,352 tend to limit its application to gestures involving fingertips that lie in a horizontal row, not including the thumb. These scanning methods cannot distinguish nor track the thumb reliably should it overlap roughly the same sensor columns as another finger, as often happens during hand scaling and rotation gestures. Likewise, presence of the palms also confuses such projective scanning methods, limiting their application to the simplest 1–3 finger gestures.

The multi-touch gesture set design in prior U.S. Pat. No. 6,323,846 by Westerman and Elias assumed that the multi-touch surface would be large enough for operation by two hands simultaneously, and that the two hands would be distinguishable so that gestures with different meanings or effects could be assigned to each hand. A two-handed multi-touch surface easily accomodates over 70 command gestures by recognizing up, down, left and right translational slides from the 7 chords per hand distinguishable by thumb presence and fingertip count, plus clockwise and counter-clockwise hand rotation and expansive and contractive hand scaling by the 4 of these chords that include the thumb. The two-handed gesture set taught in U.S. Pat. No. 6,323,846 lends itself to a complementary division-of-labor: mouse-cursor related commands and manipulations such as point, drag, and scroll were assigned to 2-fingertip, 3-fingertip, and 4-fingertip right-hand chords, while text cursor manipulation, selection via text cursor, and paging commands were assigned to the corresponding left-hand chords. (Left-handed users might want this mapping reversed). Similarly, file manipulation commands like Open, Close, Save, Back, and Forward could be intuitively mapped onto rotations, contractions and lateral slides of the right hand thumb plus 3-fingertip chord, while window manipulations like minimize, maximize, next application and previous application could be mapped to equivalent motions by the same chord on the opposite hand. Basic clipboard operations like Cut, Copy, and Paste mapped to pinches, taps, and flicks of a thumb and fingertip of either hand, while search operations like Find and Replace were mapped to pinches and flicks of a thumb and two fingertips on the left hand. Such a clearly organized division of tasks is easy to remember and helps balance the workload between the two hands.

However, such two-handed gesture sets also have disadvantages, as illustrated by past attempts to map the closely related File/Document/Subwindow Close and Application/MainWindow Exit commands to thumb plus 3-fingertip rotation gestures on opposite hands. For some users this causes bilateral confusion errors: they easily forget which hand Closes Files versus which Exits Applications, so they accidentally perform the left-hand counter-clockwise Application Exit gesture when they meant to perform the right-hand clockwise File Close gesture, or vice versa. Though the right-hand File Close uses a clockwise rotation that can intuitively be taught by analogy to closing ajar lid, the counter-clockwise rotation for left-hand Exit rotation introduces confusion: it feels like the opposite motion, similarly moving the left wrist toward ulnar deviation, but is not the same direction jarlids close. Attempting to map Exit to a simultaneous outward rotation by both hands was also poorly received by users, who don't wish to be forced to have both hands on the surface at the same time. Yet another disadvantage of the previous two-handed gesture set is that it only leaves about a dozen distinct motions free for user-customizable command mappings.

Thus there exists a need in the art for a multi-touch gesture set that avoids bilateral confusion by assigning closely-related file and application manipulation commands to sensibly-related gestures from a single hand. This need is particularly challenging because two fingertip, three fingertip, and four fingertip chords are preferably reserved for pointing, dragging, and scrolling, respectively, while the thumb plus 1-fingertip chord is preferably reserved for clipboard/editing operations, the thumb plus 2-fingertip for right mouse clicks and drags, and the five-finger chord for hand resting and zooming. This leaves only gestures by the thumb plus 3-fingertip chord to handle all core file and application manipulation commands.

Also, if such prior two-handed gesture mapping schemes are applied to a surface sized for only one hand, only half as many gestures can be supported. One-handed multi-touch surfaces are particularly important for three situtations: as the entire interface for palm-sized computers commonly known as personal digital assistants (PDAs), as a standalone desktop unit used in conjunction with a standard mechanical keyboard for interaction with a desktop personal computer (PC), or as part of a hybrid keyboard product that uses mechanical keyswitches for the primary alphanumeric layout but replaces the numberpad and text editing keys with a one-handed touch surface to the right of the alphanumeric layout.

Thus there exists a need in the art for a method to pack two-hands worth of multi-touch gesture commands and manipulations onto one hand, just as there has been a long-felt need in the art to pack two-hands worth of alphanumeric keys from a standard keyboard into a space accessible by one hand. Matias addressed this one-handed keyboard need in U.S. Pat. No. 5,288,158, which teaches an easy-to-master half-sized keyboard that acts by default as the left half of a QWERTY key layout, but acts as a reflected version of the right half QWERTY key layout for keys pressed while the thumb holds down the spacebar. Since multi-touch gesture chords are partially distinguished by initial thumb presence, using the thumb as a modifier in this fashion does not work for a multi-touch gesture set. Axthelm used a similar modifier switch and layout reflection technique for a one-handed keyboard in U.S. Pat. No. 5,367,298, while other one-handed keyboard schemes such as U.S. Pat. No. 6,142,687 to Lisak and U.S. Pat. No. 5,336,002 to Russo primarily attempt to regroup the keys in an easy-to-reach yet well-organized manner around the fingers of one hand. Though such modifier switch methods could also expand the capacity of a multi-touch gesture command set, they cannot generally work within one hand since most multi-finger gestures already involve the whole hand for their motion. A second hand, or even a foot, would be needed to activate the modifier key or chord, and coordinating two hands simultaneously requires considerably more cognitive and postural effort from the user than a one-handed solution. Thus there exists a further need in the art for a method to pack multi-touch gestures into one hand without requiring awkward modifier holds by that same hand or the opposite hand.

SUMMARY OF THE INVENTION

The present invention adapts the finger arrangement template matching method of co-pending U.S. patent application Ser. No. 09/681,178 to distinguish gestures performed with the fingers in a relaxed, fairly compact posture from equivalent gestures performed with fingers outstretched. A two-handed gesture set can then be folded into one hand by mapping gestures from one of the two hands to outstretched placement while mapping gestures from the other of the two hands to relaxed placement. In some cases, users are instructed to use different fingertip combinations for the relaxed and outstretched placements to maximally distinguish the two cases with minimum conscious effort from the user. Ultimately, however, the present invention responds to differences in the spatial arrangement amongst touches, not the combination of fingers actually used. While fingers can potentially be placed in a near infinite variety of slightly different spatial arrangements, people cannot deliberately and accurately reproduce that many different placements on a smooth surface, and many possible placements turn out to be awkward as starting arrangements for further rotation or scaling motions. Thus the neutral and spread arrangements preferred by the present invention are notably the least awkward and most easily reproducible choices for doubling the capacity of multi-finger gesture sets.

Even different chords or combinations of touching fingers do not always produce recognizably distinct contact patterns, especially from the perspective of sensing systems that detect flesh contact with the surface but cannot detect the overall hand structure hovering well above the surface. Some finger combinations that are distinct from the sensing system's perspective are in fact very difficult for people to perform, such as chords in which the middle and pinky fingers touch but the ring finger must be suspended above the surface. (See U.S. Pat. No. 5,642,108 to Gopher et al. for a table of the relative perceptual and motor difficulties of the 31 different chords formable from all combinations of the fingers from one hand). Thus the distinctions between relaxed versus outstretched fingers can be stronger than those between different combinations of relaxed fingers, both for the sensing system and for users, who can clearly feel the difference between the relaxed and outstretched postures. These strong distinctions help to minimize both recognition errors and user performance errors.

The relaxed versus outstretched distinction becomes particularly intuitive when used to distinguish file/subwindow versus application/mainwindow commands. In conventional graphical user interfaces (GUIs), applications such as word processors can display several files or documents in subwindows arrayed within the application's main window frame. The user can intuitively imagine that gestures by an outstretched hand grab or apply to the application's larger mainwindow frame, while gestures performed with the hand more relaxed and compact affect the smaller document subwindows. This mapping of outstretched gestures to application-level commands and relaxed gestures to document-level commands is also consistent with the relative usage frequencies of the two command categories. As the user works on a document or documents within one appliacation, commands such as as opening, saving, closing and switching between subwindows are fairly frequent, and should therefore be mapped to the easier, relaxed hand posture. Most users switch between applications more rarely, so commands that manipulate whole application windows should be mapped to the more effortful outstretched hand posture.

The above mapping method is equally intuitive when extended to other families of hierarchically related commands. For instance, for a family of search commands like Find, Replace, Search Next and Search Previous, gestures for each command performed with the relaxed, neutral hand might limit the search operations to the current ('local') file. Meanwhile, performing the same gestures (i.e., moving the same number of fingers in equivalent directions) using outstretched fingers would invoke the 'global' versions of the commands to search across ALL files. Likewise, performances of Home and End gestures with the fingers relaxed and normally spaced can be mapped to jump the cursor to the beginning or end of a line of text, while equivalent motions using outstretched fingers map to jumping to the beginning or end of a whole paragraph or document.

OBJECTIVES OF THE INVENTION

The primary objective of this invention is to pack two hands' worth of multi-touch gesture command mappings onto one hand in a sensible and well-organized manner.

Yet another objective of this invention is to pack mappings for the most common mouse manipulation, text cursor manipulation, clipboard and related editing operations, file and application manipulation commands into the gesture set of one hand.

A further objective of this invention is to avoid the bilateral confusion that results when similar commands are mapped to equivalent gestures on opposite hands.

Yet another objective of this invention is to free up for user-customizable or application specific commands most of the gesture map of the non-dominant hand in two-handed systems.

A further objective of this invention is to double the number of distinctly recognizable gestures available on each hand without relying upon hard to perform or distinguish finger combinations and without relying upon simultaneous modifying activity by the opposite hand.

Yet another objective of this invention is to create an intuitive distinction between gestures by outstretched fingers that apply to main application windows and gestures by relaxed, neutral fingers that apply to the smaller documents, files, and subwindows.

A more general objective of this invention is, for families of hierarchically related commands, to create an intuitive distinction between gestures that map to 'local' versus 'global' versions of the commands, preferably with equivalent motions by outstretched fingers mapping to the 'global' version of each command.

DETAILED DESCRIPTION OF THE INVENTION

Figure 1:
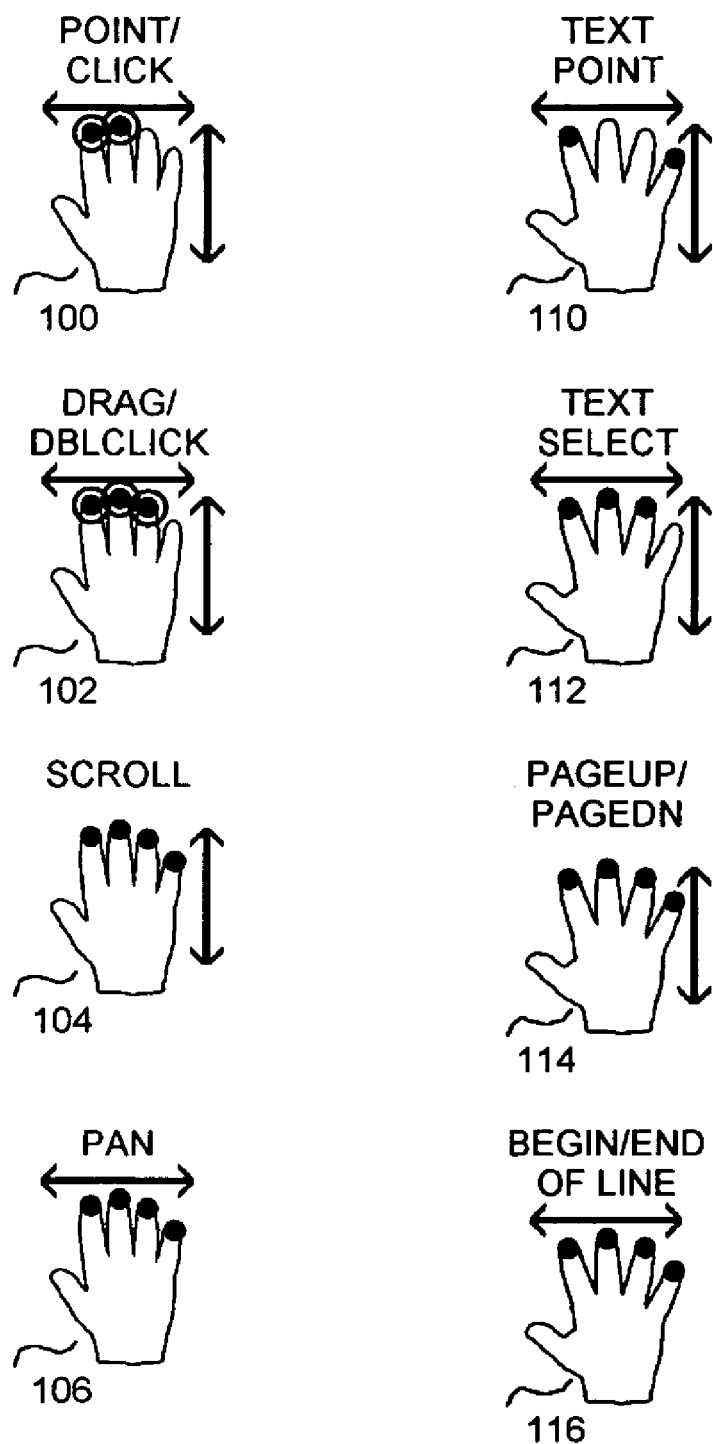
FIG. 1 is an annotated gesture quick-guide illustrating preferred cursor functions for two, three, and four fingertip, neutral and spread chords as a preferred embodiment of a packed one-handed gesture set.

Conceptually, the present invention folds the prior two-handed gesture set of U.S. Pat. No. 6,323,846 into one hand by keeping relaxed or neutral-hand versions of the original right hand gestures but mapping the original left hand gestures into equivalent right hand motions that start with fingers deliberately outstretched. Mouse pointing, dragging, and scrolling have become very basic operations for personal computers, and are therefore allocated to the simplest-to-perform chords: two fingertips, three fingertips, and four fingertips, respectively. A clever method for supporting text pointing, text selection, and text paging operations on the same hand with these same chords is for the system to distinguish whether the fingertips are arranged close together or spread apart as they touch the surface and begin the operation. FIG. 1 is a gesture quickguide with annotated hand icons that show the preferred mappings for these two, three, and four fingertip chords. In these quickguides, black-fill indicates which fingers should touch at the beginning of the gesture, bullseye circles indicate a brief tap of the surface without lateral sliding, and arrows drawn around the hand icons indicate the direction(s) the hand can slide to execute a particular gesture. The hand icon annotations include the name of the mapped command to be invoked when the system recognizes the indicated gesture. The actual hotkey or mouse emulation signals generated by the gesture recognition system to invoke each command vary depending on the operating system or application environment, and are not shown. In FIG. 1, the relaxed or neutral version of each chord maps to a mouse cursor operation like Point and Click 100, Drag and Double-Click 102, Scroll 104, or Pan 106, while the spread version of each chord maps to the corresponding text cursor operation such as Text Cursor Point 110, Text Cursor Select 112, PageUp/PageDn 114, or cursor to Beginning/End of Line 116. For most application software, the multi-touch system would generate Arrow keys to cause Text Cursor Point 110, <Shift>Arrow keys for Text Cursor Select 112, and Home/End keys for Beginning/End of Line 116, although older applications like the Emacs text editor might require different key sequences for these operations. In the case of Text Cursor Point 110, the neutral/spread distinction is more reliable if users simply touch with non-adjacent fingertips (index and pinky). Attempting to spread two adjacent fingertips (e.g. index and middle) can lead a finger identification process (414 in FIG. 7) to mistake them for a thumb/fingertip pair as the angle between fingertips tends more diagonal than horizontal. For text selection 112 and paging 114, three or four adjacent fingertips are safely used, but must be spread significantly before touching down on the surface and translating in the desired selection direction. Such spreading is very difficult for most people to do while the fingers are curled, so the fingers usually straighten as well before they touch the surface.

Figure 2:
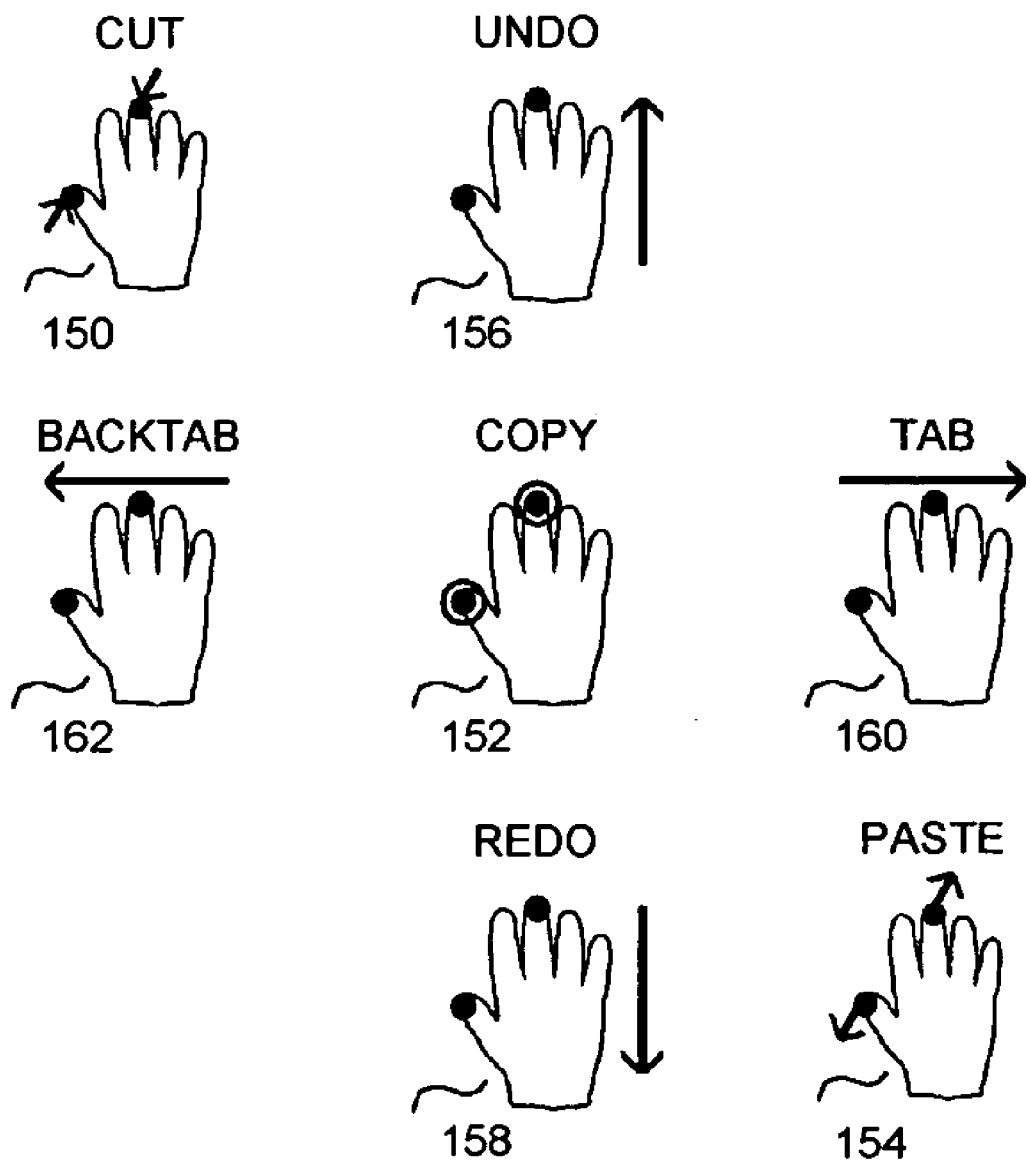
FIG. 2 is an annotated gesture quick-guide illustrating editing command mappings for gestures of the thumb and one-fingertip chord as a preferred embodiment of a packed one-handed gesture set.

FIG. 2 shows the thumb plus one-fingertip clipboard gestures for the preferred embodiment of a one-handed gesture set. Since the prior two-handed gesture set used identical gestures on each hand for clipboard operations, the neutral/spread distinction is not needed to fold clipboard operations into one hand. Cut 150, Copy 152, and Paste 154 clipboard operations remain most intuitive as a pinch, tap, or flick, respectively, of the thumb and a fingertip, preferably the middle fingertip. Upward and downward translations of this same thumb and fingertip chord preferably map to Undo 156 and Redo 158, respectively, while leftward and rightward translations of this same thumb and one fingertip chord map to Tab 160 and BackTab 162, respectively.

Figure 3:
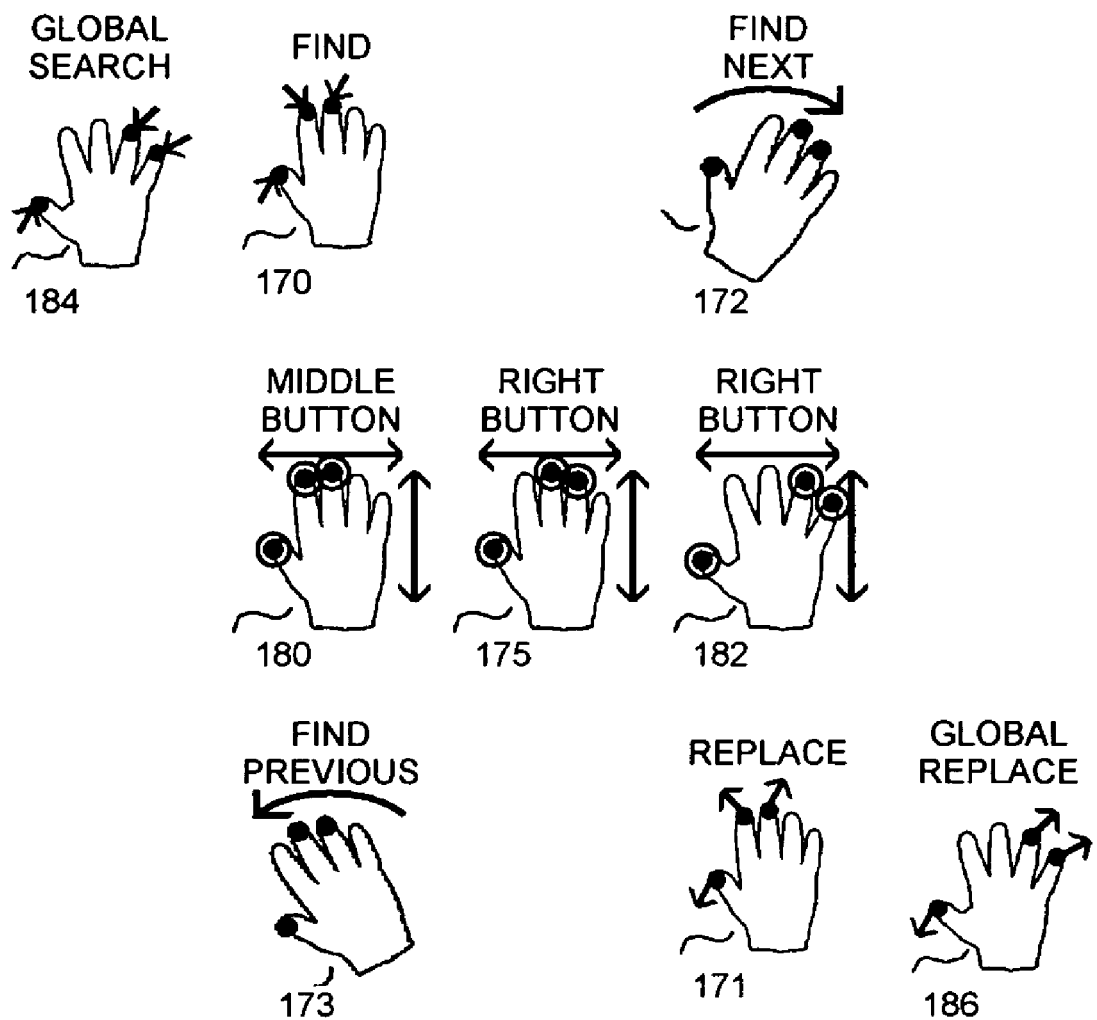
FIG. 3 is an annotated gesture quick-guide illustrating search command and secondary button mappings for the thumb and two-fingertip neutral and spread chords as a preferred embodiment of a packed one-handed gesture set.

In a preferred embodiment, search operations as well as secondary and tertiary mouse button emulation are mapped onto the thumb plus two-fingertip chord, as shown in FIG. 3. Hand scaling motions invoke Find 170 and Replace 171, while rotations invoke Find Next 172 and Find Previous 173. Meanwhile, users who only need two-button mouse emulation can tap or translate this chord for Right-button Click/Drag 175, using the fingertips of their choice. These basic search and 2-button mouse emulation are sufficient for novice users, for whom distinct neutral/spread gestures are unnecessary on this thumb plus two-fingertip chord. However, more advanced users require 3-button mouse emulation and possibly richer search functionality. For them, taps and translations of the neutral chord (typically performed with the thumb, index, and middle fingertips) sensibly map to Middle-button Click/Drag 180, while the corresponding motions of thumb, ring, and pinky spread toward the edges of the surface invoke Right-button Click/Drag 182. Similarly, advanced users could configure distinct spread versions of the search gestures to automatically search across multiple files rather than just the current document. A flick of a spread thumb, ring and pinky can map to Global Replace 186 (across multiple files in a project). Similarly, a pinch of this spread chord can invoke Global Search 184 to start a search across multiple files, an entire hard disk, or the internet.

Figure 4:
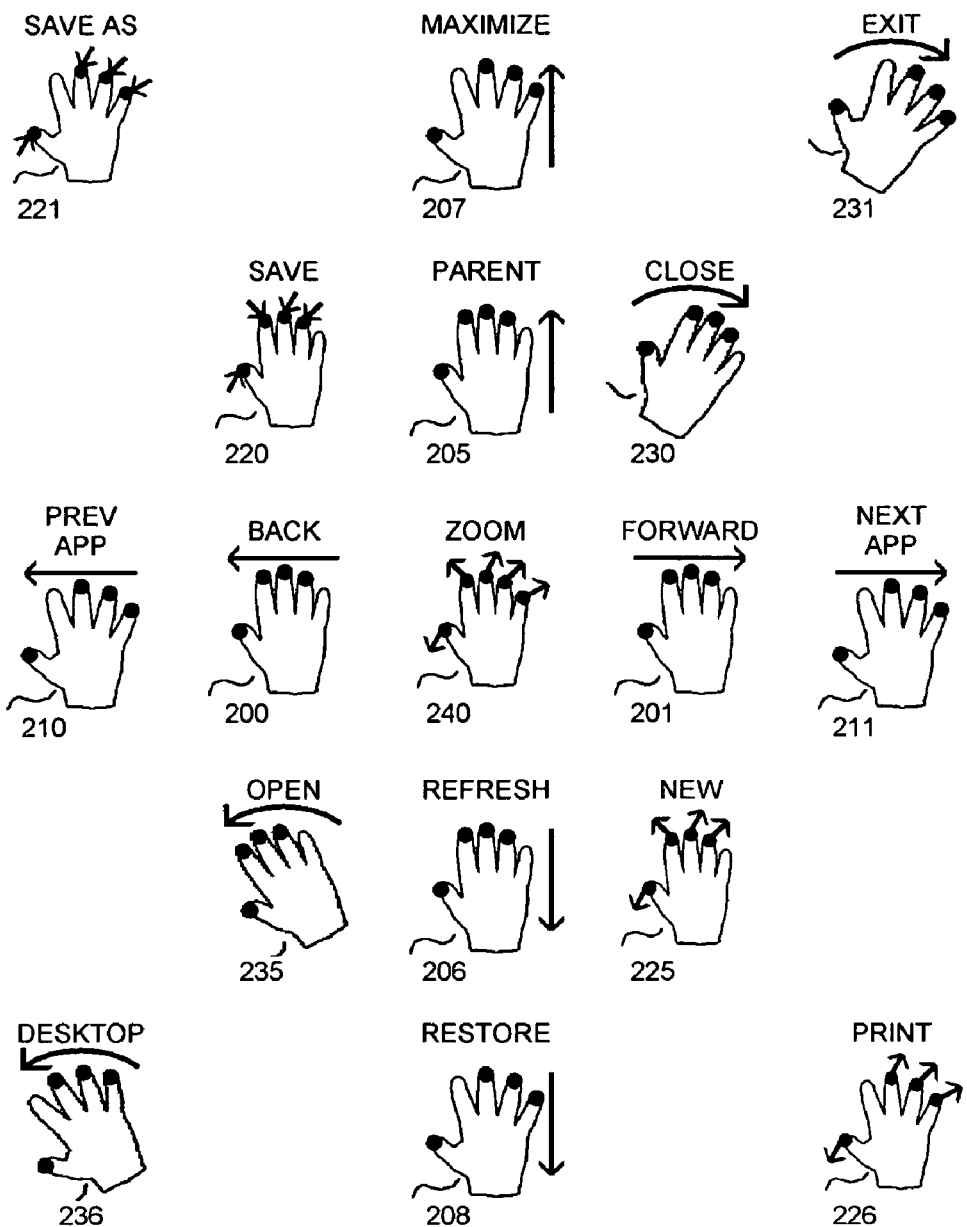
FIG. 4 is an annotated gesture quick-guide illustrating file and application command mappings for the thumb and three-fingertip neutral and spread chords as a preferred embodiment of a packed one-handed gesture set.

A most intuitive application of distinct neutral and spread-hand gestures is to pack both file/document and application/mainwindow management commands onto the thumb plus three fingertip chord of the same hand, as shown in FIG. 4. If the thumb is placed only about two inches away from the index, middle, and ring fingertips, sliding left preferably maps to a browse Back (Previous File) 200 command, while sliding right issues a browse Forward (Next File) 201 command. This is particularly intuitive because these motions mimic the actual motions of turning a page in a book. However, these same motions performed with the thumb spread 4–5 inches from the middle, ring and pinky fingertips (index remains lifted) can be recognized as Previous App 210 and NextApp 211 application switching commands, respectively. An upward translation of this chord starting with the thumb placed about two inches from the index, middle, and ring fingertips preferably issues the Parent or Up Directory command 205 while a downward translation issues the window Refresh command 206. Meanwhile, upward and downward translations starting with the thumb 4–5 inches from the middle, ring and pinky fingers preferably toggle window state between Maximize 207 and Restore 208.

A contraction or pinch of this chord conveniently invokes Save 220 when the thumb starts a couple inches from the index, middle and ring fingers, intuitively matching the compression animations that often denote saving files, but a contraction or pinch with the thumb starting 4–5 inches from the middle, ring and pinky can be recognized as the Save As . . . 221 command. An expansion or flick of this chord preferably invokes New Document 225 when the thumb starts a couple inches from the index, middle and ring fingers, while the same motion starting with the thumb starting 4–5 inches from the middle, ring and pinky can be recognized as Print 226.

A clockwise rotation of this chord starting with the thumb placed about two inches from the index, middle, and ring fingertips can issue the Close File or Subwindow command 230, while the same rotation starting with the thumb spread 4–5 inches from the middle through pinky fingertips issues the Exit Application or Mainwindow command 231. Putting both Close File 230 and Exit Application 231 gestures on the same hand rather than mapping them to equivalent rotations on opposite hands is less error-prone for people who inadvertently confuse their left and right hands. A counter-clockwise rotation of this chord starting with the thumb placed about two inches from the index, middle, and ring fingertips can issue the Open File 235 command, whereas the same rotation starting with the thumb spread 4–5 inches from the middle through pinky fingertips preferably issues Hide All or Show Desktop 236, which typically hides all application windows to facilitate selecting desktop icons to open other applications. Note that the recommendation of thumb, index, middle, and ring fingertips for neutral gestures but thumb, middle, ring, and pinky fingertips for spread gestures helps ensure that novices create distinctly neutral or spread finger placements, but touching with exactly the same finger combinations for both neutral and spread gestures will also work.

Figure 5:
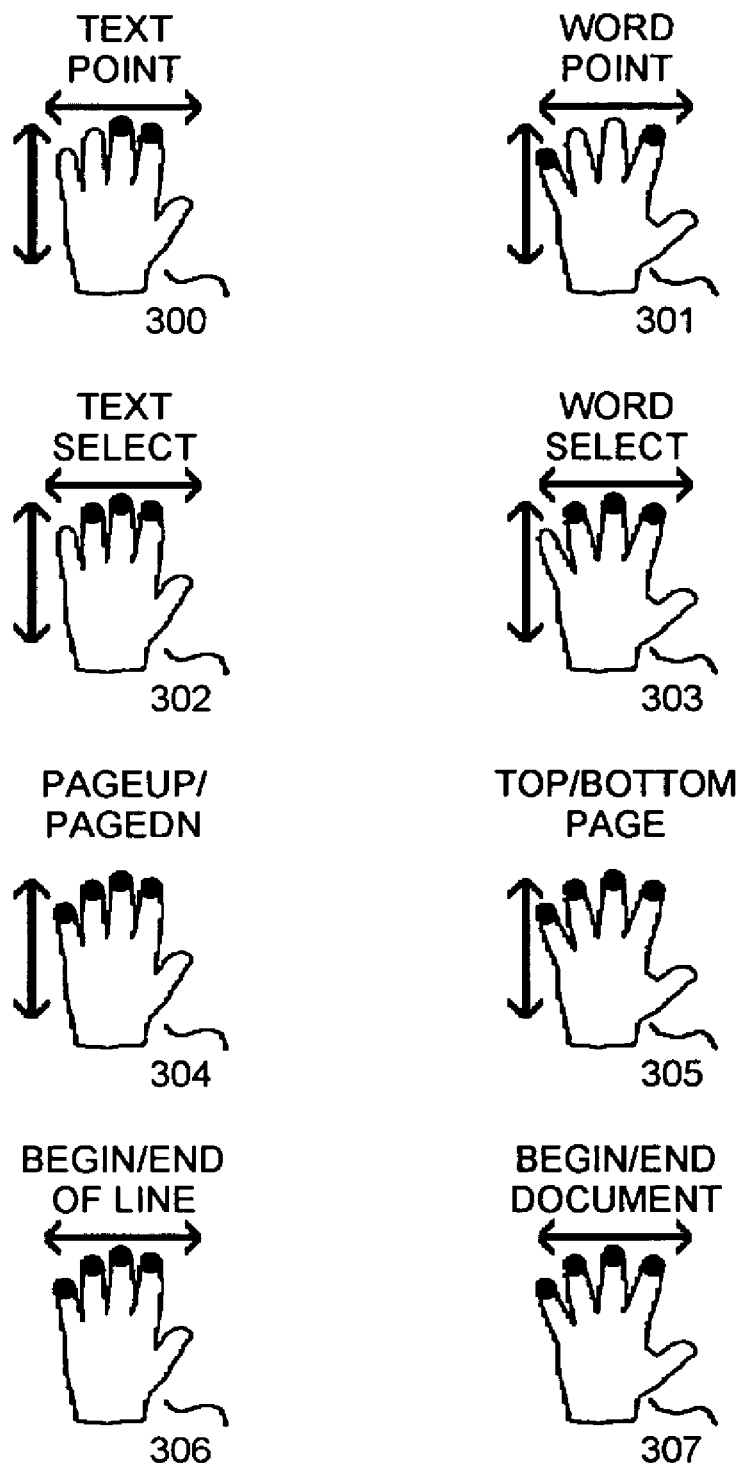
FIG. 5 is an annotated gesture quick-guide illustrating text cursor motion mappings for gestures of two, three, and four fingertip, neutral and spread left hand chords as a preferred embodiment of an enhanced two-handed gesture set.

The discussion so far has described a preferred one-handed gesture set. For two-handed surfaces, the efficient packing of core gestures onto the dominant hand using the neutral/spread distinction also frees up chords on the other hand for user-customizable or application-specific gesture sets. Because direct text cursor manipulation is so quick for common word processing and text editing tasks, and spread gestures are a bit more awkward than neutral, a revised two-handed gesture set as shown in FIG. 5. would preferably retain neutral two, three, and four fingertip left (non-dominant) hand mappings for Text Cursor Point 300, Text Selection 302, Paging 304, and Cursor to Beginning/End of Line 306. However, spread versions of these motions are then available for 'coarser' levels of manipulation, such as jumping the cursor across whole words or paragraphs, rather than one character at a time. Left and right translations of two spread fingertips 301 preferably jump the text cursor to the previous or next word, respectively, usually by emitting <Ctrl>Arrow key sequences, while up and down motions jump by paragraphs instead of lines in many applications. Horizontal translations of three spread left-hand fingertips 303 preferably select text in these same increments, usually via <Ctrl><Shift>Arrow key sequences, while horizontal slides of four spread fingertips 307 sensibly jump to the beginning or end of the document, usually via <Ctrl>Home or <Ctrl>End key sequences. Vertical slides of four spread lefthand fingertips 305 preferably generate <Ctrl>PageUp/PageDown, which variously jumps the cursor to the top or bottom of the page or chapter, or other special paging function depending on the application. Using the above preferred scheme, a variety of gestures are available on the left hand to directly navigate and edit large documents at multiple scales.

Figure 6:
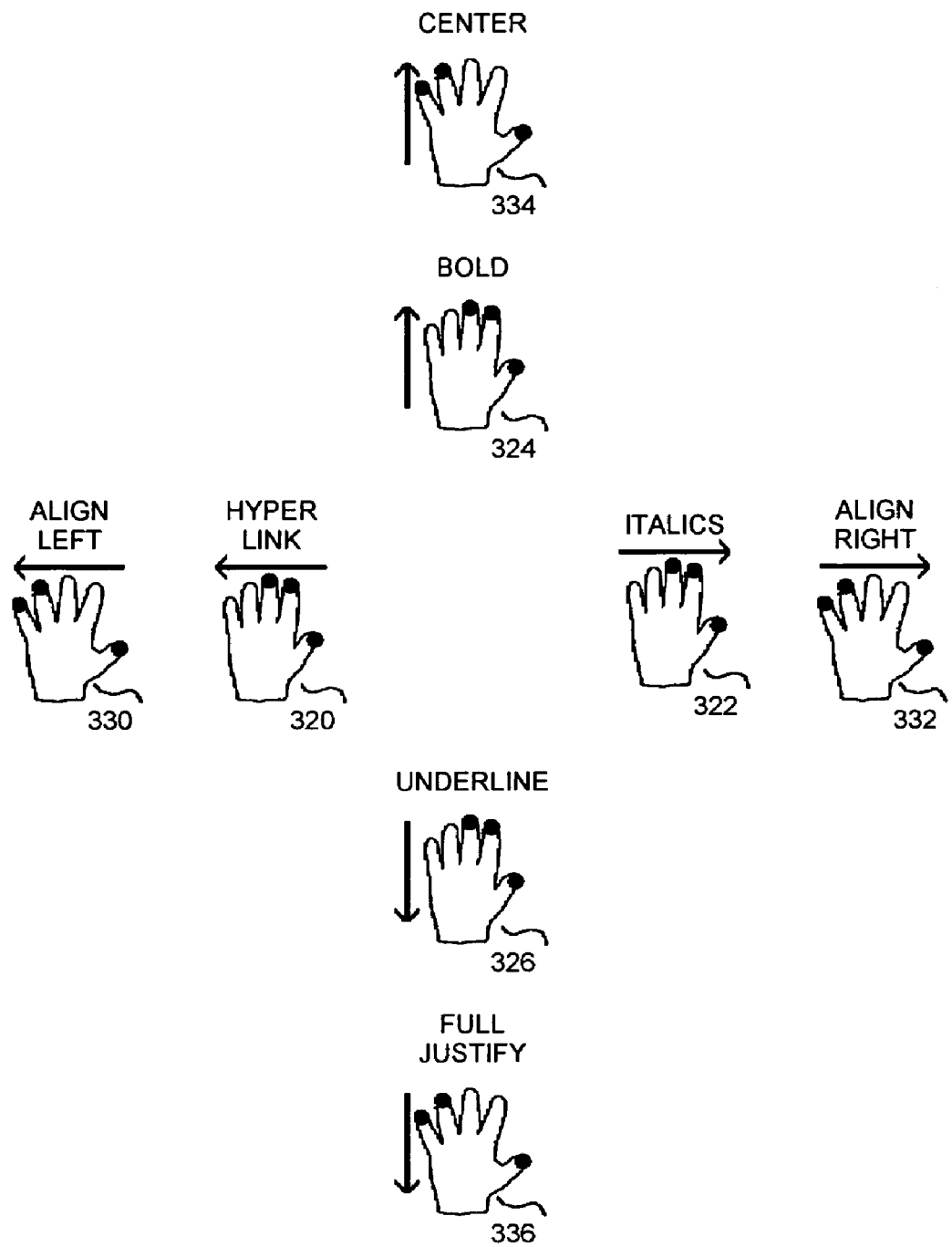
FIG. 6 is an annotated gesture quick-guide illustrating styling and alignment command mappings for the thumb and two-fingertip neutral and spread left hand chords as a preferred embodiment of an enhanced two-handed gesture set.

Thanks to neutral/spread gesture packing on the right hand, the left hand thumb plus two fingertips and thumb plus three fingertip chords are also available for more advanced, application-specific gesture sets. For word processing, gestures that adjust text formatting and alignment are one particularly intuitive use of the left-hand thumb plus two-fingertip chord. As shown in FIG. 6, translations of the neutral version of this chord can toggle Hyperlink 320, Italics 322, Bold 324, and Underline 326 text styling. Meanwhile, translations of the spread chord can command Align Left 330, Align Right 332, Align Center 334, and Full justify 336. Note that each command is assigned a gesture motion direction that makes intuitive sense: Italics 322 to the right, the slant direction of italicized text, Underline 326 downward, where the underline goes, and Bold 324 upward, for enlargement, making the mappings much easier for users to remember. The direction of motion for the text justification gestures also mimic each command's action. Without the neutral vs. spread distinction, it would not be possible to fit intuitive translation motions for all 8 of these commands onto the thumb plus two-fingertip chord.

Since the right-hand thumb plus three-fingertip chord is dedicated to basic file/document and application/mainwindow management, a sensible use of the left-hand thumb plus three-fingertip chord in a two-handed gesture set is for more specialized forms of window management, such as virtual desktops. Virtual desktops are especially popular with Linux window managers such as KDE and Sawmill. Application windows are typically apportioned to different desktops of a 2×2 or 3×3 virtual desktop grid, but only one desktop is actually visible at a time. The most common operation on virtual desktops is switching the visible desktop, while the second most important operation is moving applications to a different desktop. Therefore a sensible neutral vs. spread mapping would assign translational gestures by neutral thumb, index, middle, and ring fingers to switching the visible desktop, while equivalent motions by spread thumb, middle, ring and pinky fingers would move the current application to a different desktop.

Figure 7:
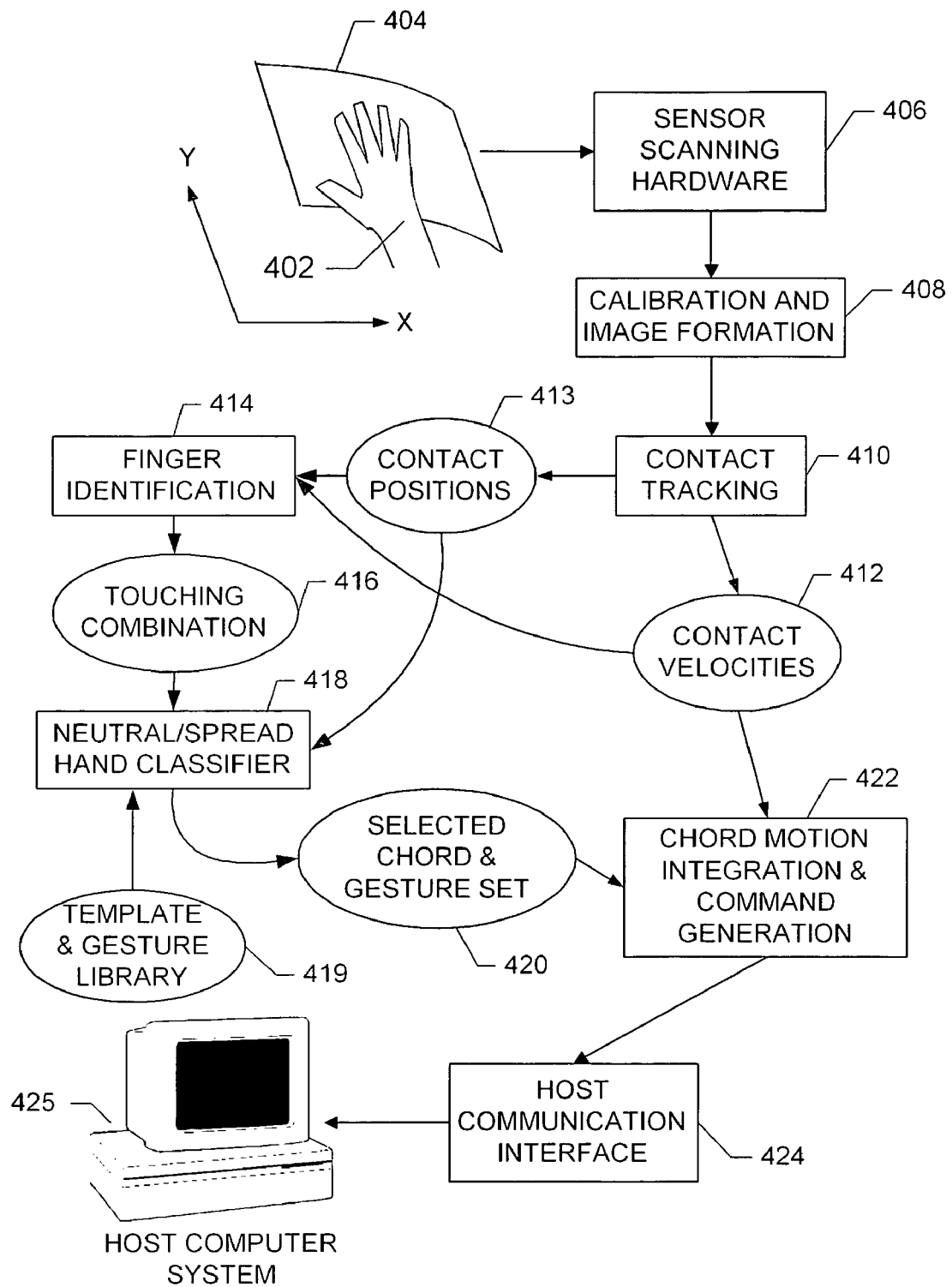
FIG. 7 is a block diagram of a multi-touch surface apparatus and gesture recognition system augmented with the novel neutral/spread-hand classifier of the present invention.

The gesture sets cited above are best detected and recognized by a multi-touch surface apparatus 404 and accompanying recognition processes illustrated by the FIG. 7 block diagram. The multi-touch surface apparatus 404 can be sized for one or more hands 402, and may contain proximity sensors that detect flesh contact with the surface, as detailed in prior U.S. Pat. No. 6,323,846 to Westerman and Elias. In alternative embodiments, separate optical or acoustic sensing systems could be used to image the hands and infer contact with the surface. Such systems typically employ sensor scanning hardware 406 and calibration and image formation processes 408 to enable tracking of finger contacts 410 across the surface. The contact tracking module 410 continuously supplies contact positions 413 and velocities 412 to higher-level recognition modules. A finger identification module 414 determines the combination of touching fingers 416 from the contact positions 413 and velocities 412. Depending on the underlying sensing technology 404 and implementation of the finger identification module 414, the touching combination 416 may simply convey the current number of contacts, or a report of thumb presence and fingertip count, or the exact combination of identities, e.g., thumb, index, and ring fingers currently touching.

For purposes of distinguishing neutral and spread gesture sets, prior recognition processes 404–416 and 422–424 must be augmented with a novel neutral/spread-hand classifier 418 that uses the touching combination 416 and contact positions 413 to decide whether the touching fingers are neutral or spread and then select the appropriate chord gesture set 420 from the library 419. Ultimately, the touching combination 416 and whether the finger arrangement is neutral or spread at the beginning of the slide should determine which command gets issued in response to tapping or sliding in a particular direction. Further spreading or contracton of the hand later in the slide can still be interpreted as a pinch or flick gesture, but should not affect chord selection. To appreciate the utility of creating the novel neutral/spread-hand classifier 418 to supplement prior finger identification processes 414, consider the strengths and limitations of state-of-the-art finger identification in prior U.S. Pat. No. 6,323,846 to Westerman and Elias, which classifies chords as to thumb presence and number of fingertips. That attractor-based finger identification process incorporates contact area and velocity 412 comparisons in addition to contact position comparisons 413, and thus can verify thumb presence more robustly than simple matching comparisons between templates for, as an example, an arrangement of 4 fingertips vs. an arrangement of 3 fingertips +1 thumb. It also establishes a reliable ordering of finger contacts around the attractor ring, essentially ordering them along the X axis if palm contacts are not considered. However, that prior finger identification process has noted weaknesses in establishing exact identity amongst the fingertips unless all four are touching. Its guesses assume the hand is perfectly neutral and centered over the attractors, assumptions that produce misleading identifications for spread or partially-spread hands. The lack of information about lifted fingers and overall hand structure (how each finger connects to the palm) in proximity images 408 cause these weaknesses. Hence, the novel neutral/spread-hand classifier 418 of the present invention abandons further attempts to guess exact fingertip identity solely from surface contact locations, an impossible task given the flexibility of the fingers and potential for differently shifted sets of fingers to create seemingly identical surface contact patterns. Rather, the present invention uses arrangement-template matching to test in the most direct manner whether the contacts appear neutral or deliberately spread, regardless of true fingertip identity. The addition of the neutral/spread-hand classifier 418 thus doubles the number of multi-finger chords and gesture sets distinguishable with the finger identification process of U.S. Pat. No. 6,323,846 from 7 to 14 per hand.

The novel neutral/spread-hand classifier 418 is equally applicable to alternative sensing apparatus 404 and finger identification processes 414 that can detect finger and hand structure, presumably with optical or acoustic radar techniques, thus reliably supporting exact identification of all touching fingers and classifying a full 31 combinations of touching fingers, 26 of which contain more than one finger. When coupled with such an apparatus, the novel neutral/spread-hand classifier 418 potentially doubles the number of selectable multi-finger chords and gesture sets from 26 to 52.

Figure 8:
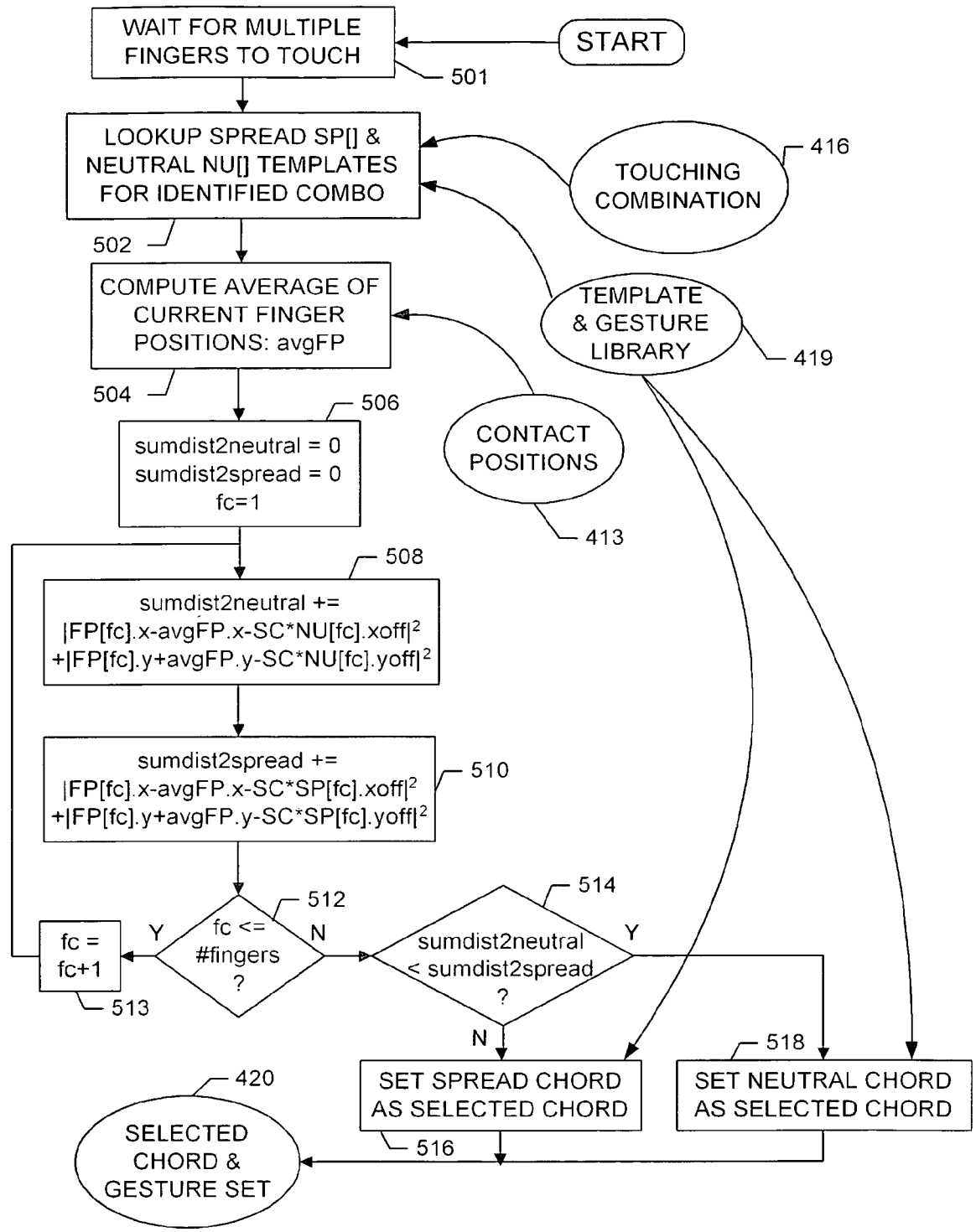
FIG. 8 is a flowchart detailing the preferred method for classifying neutral and spread chords via arrangement template matching.

The preferred embodiment of this novel neutral/spread classifier 418 is further specified in the flowchart of FIG. 8, and utilizes the same arrangement-template matching technique that is applied to modifier arrangement chords in co-pending U.S. patent application Ser. No. 09/681,178. A pair of arrangement templates, one for neutral and one for spread, is constructed for each possible touching combination and stored in a gesture library 419 along with the pre-configured gesture commands, pointing functions, or other input events that should be generated in response to particular motions of the chord matching each template. The neutral template consists of X & Y contact coordinates for the ideally neutral arrangement, and the spread template consists of X & Y contact coordinates for a maximally spread arrangement, so that each template basically encodes the relative coordinates of a hand icon's filled black circles from FIGS. 1–6. Encoding each template's position coordinates as offsets from the centroid of its contact locations (filled black circles) will keep the template matching computations neutral to absolute hand position on the surface. Ultimately, the touching combination 416 and whether the finger arrangement is neutral or spread 514 at the beginning of the slide should determine which command gets issued in response to tapping or sliding in a particular direction. Thus step 501 waits for multiple fingers to initially touch as a chord before starting additional chord selection steps. Step 502 of the present invention looks up the particular pair of templates for the initial touching combination and stores these as the working templates 5P[ ]and NU[ ]for further comparison.

Step 504 computes the absolute average avgF Pof current fingertip positions FP[ ] to further ensure that the template matching comparisons remain neutral of absolute hand position. Step 506 zeroes the working sums sumdist2neutraland sumdist2spread, which will hold the total squared distance mismatch between current finger positions FP[ ] and neutral NU[ ] or spread SP[ ]arrangement templates, respectively. Step 506 also initializes the finger loop counter fc to 1. Step 508 adds the squared distance mismatch for the finger contact FP[fc]and its corresponding neutral template point NU[fc] to the working sum sumdist2neutral. SC is a scale factor which can be set slightly greater or less than 1 for people with larger or smaller than normal hands, respectively. This customizes the matching process to their hand size (and correspondingly larger neutral and spread arrangements) without having to actually scale up or down the template coordinates NU[ ] for SP[ ]for each person. Step 510 similarly adds finger contact FP[fc]'s squared distance mismatch for spread template point SP[fc] to the working sum sumdist2spread. Decision diamond 512 checks whether the squared distances for all touching finger contacts have been included yet, and if not step 513 advances fc to the next finger contact.

Once all touching fingers have been added, decision diamond 514 compares the two working sums sumdist2neutral and sumdist2spread, the lower sum indicating the closer template match. If the neutral arrangement template NU[ ] is the closer match, step 518 sets the neutral version of the chord, along with any slides, commands, and events configured for the neutral chord, as the selected chord 420. Otherwise, if the spread arrangement template SP[ ]is the closer match, step 516 sets the spread version of the chord, along with any slides, commands, and events configured for the spread chord, as the selected chord 420.

Returning to FIG. 7, the motion integration and event generation process 422 of prior U.S. Pat. No. 6,323,846 looks up the parameters for all gestures assigned to the selected chord 420, and for each possible gesture, integrates hand motion in all directions, including scaling and rotation, and generates the command or mouse function events pre-configured for that gesture when or if the integrated motion reaches pre-configured sensitivity thresholds. The host communication interface 424, often implemented as Universal Serial Bus, passes these commands and events to a host computer 425 and its associated operating system and application software. In some embodiments, such as a handheld computer with multi-touch screen, all elements of FIG. 7 may be integrated into one package and share one central processing unit. In this case, the host communication interface 424 may consist simply of shared-memory message-passing between the gesture recognition processes 408–422 and user application processes.

A subtle implementation detail for multi-finger gesture recognizers is how to decide when the touching combination has stabilized, i.e. when all fingers defining the chord have reached the surface, so that chord selection (which the present invention augments with finger arrangement selection in FIG. 8) can be finalized and motion integration 422 can begin. The simplest solution is to simply wait a fixed time such as 100 milliseconds after the first finger touch before attempting chord selection, but such a large recognition and event generation delay may be noticed by users attempting quick cursor motions. A more flexible approach, as taught in U.S. Pat. No. 6,323,846 to Westerman and Elias, is to repeat the chord selection process with the new touching combination and restart motion integration only if additional fingers touch before motion integration reaches any sensitivity thresholds (and generates irreversible commands or events). In any case, once all fingers lift off the surface, processing should return to step 501, so the chord and finger arrangement selection processes of FIG. 8 can restart from scratch with the next gesture as it begins.

Those skilled in the mathematical arts can intuitively predict the results of the arrangement template matching method in FIG. 8 by realizing that finger arrangements roughly the same shape as the templates will be classified as spread if they are larger than the average of (halfway between) the neutral and spread template sizes. For finger arrangements shaped differently than the templates, the present matching method will tend to prefer the template with closest size and shape. These mathematical intuitions are helpful in designing optimally sized and shaped spread and neutral templates. It is very important that casually relaxed gesture performances not be mistaken for spread gestures. In other words, for normal-sized adult hands, only a deliberately outstretched hand should ever be classified as spread. Since the classification cutoff explained above lies halfway between the neutral and spread template sizes, spread template coordinates are preferably designed to correspond to a maximally outstretched hand so that only deliberate spreading falls larger than the average of the template sizes. Similarly, template shapes can be exaggerated to increase sensitivity to slight shape differences between neutral and spread hands. For instance, spread fingertips lie along a fairly strong arc, but neutrally adjacent fingertips lie in more of a straight horizontal line, so exaggerating the arc of contacts in the spread template may improve the system's discrimination.

Those skilled in the pattern recognition art may be able to conceive alternative, but probably inferior, neutral/spread classification methods. For instance, steps 508 and 510 could sum absolute distances rather than squared distances, but this would be less sensitive to shape discrepancies. Likewise, arrangement size measures could be conceived that distinguish neutral/spread arrangements totally independent of shape, by for instance thresholding the distance between leftmost and rightmost finger contact. Then the gesture library would store a neutral/spread separation threshold for each touching combination, instead of a pair of arrangement templates. However, such methods would in general provide less precise discrimination than the preferred method of template arrangement matching, which considers both size and shape in a balanced manner.

Though embodiments and applications of this invention have been shown and described, it will be apparent to those skilled in the art that numerous further embodiments and modifications than mentioned above are possible without departing from the inventive concepts disclosed herein. The invention, therefore, is not to be restricted except in the true spirit and scope of the appended claims.

What is claimed is:

1. A method for doubling the number of distinct multi-touch gestures that can be mapped onto a hand, the method comprising the following steps:

waiting for multiple fingers to touch a surface apparatus;

classifying the combination of fingers that initially touch the surface as a particular chord;

measuring the geometric arrangement of the fingers;

testing whether this geometric arrangement matches that of a neutral, relaxed hand, or of a hand whose fingers have been spread deliberately;

if the finger arrangement tests neutral, selecting a neutral set of gesture functions or commands for the classified chord;

if the finger arrangement tests spread, selecting a spread set of gesture functions or commands for the classified chord that are intuitively related to the neutral set;

generating function or command signals to a host computer from the selected set in response to subsequent finger motions;

and, clearing the selected set and restarting the above steps after liftoff of all the fingers.

2. The method of claim 1, wherein geometric finger arrangement testing further comprises the following sub-steps:

constructing for each classifiable chord a pair of templates modeled upon contact coordinates from typical neutral and maximally spread performances, respectively, of that chord, and storing these templates in a gesture library;

retrieving from the gesture library the template pair associated with the particular chord classified by the combination of fingers initially touching, and storing this template pair as the working templates;

computing the total mismatch between coordinates of the initially touching fingers and the neutral working template;

computing the total mismatch between coordinates of the initially touching fingers and the spread working template;

and, classifying the finger arrangement as spread if the total mismatch to the spread working template is smaller, or neutral if the total mismatch to the neutral working template is smaller.

3. The method of claim 1, wherein both mouse cursor and text cursor manipulation capabilities are packed into one hand by mapping chords of two, three, and four neutrally adjacent fingertips to point, drag, and scroll mouse cursor functions, respectively, while mapping chords of two, three, and four spread fingertips to pointing the text cursor, selection via text cursor, and text paging functions, respectively.

4. The method of claim 1, wherein secondary and tertiary mouse button emulation are packed into a thumb and two fingertip chord by mapping clicks and drags by one of these buttons to taps and translations of a neutral thumb and two fingertip chord, while mapping clicks and drags by the other of these buttons to taps and translations of a spread thumb and two fingertip chord.

5. The method of claim 1, wherein local and global search and replace gestures are packed into a chord consisting of the thumb and a fixed number of fingertips by mapping flicks, pinches, and rotations that start with the hand neutral to local search and replace functions, while mapping equivalent motions that start with the hand spread to corresponding global search and replace functions.

6. The method of claim 1, wherein text styling and alignment gestures are packed into a chord consisting of the thumb and a fixed number of fingertips by intuitively mapping translational slides that start with the hand neutral to text styling functions, while mapping translational slides that start with the hand spread to alignment commands that intuitively match the direction of translation.

7. The method of claim 1, wherein fine and coarse text cursor manipulation gestures are packed into one hand by mapping:

horizontal slides of two neutrally adjacent fingertips to character-wise text cursor motion, horizontal slides of two spread fingertips to word-wise text cursor motion, vertical slides of two neutrally adjacent fingertips to line-wise text cursor motion, vertical slides of two spread fingertips to paragraph-wise text cursor motion, horizontal slides of three neutrally adjacent fingertips to character-wise text selection, horizontal slides of three spread fingertips to word-wise text selection, vertical slides of three neutrally adjacent fingertips to line-wise text selection, vertical slides of three spread fingertips to paragraph-wise text selection, horizontal slides of four neutrally adjacent fingertips to beginning and end of line commands, horizontal slides of four spread fingertips to beginning and end of document commands, vertical slides of four neutrally adjacent fingertips to page up and down commands, and vertical slides of four spread fingertips to a special paging function.

8. The method of claim 1 wherein relaxed two-fingertip translations specifically map to mouse pointing commands while spread two-fingertip translations map to text pointing commands, relaxed three-fingertip translations map to mouse dragging while spread three-fingertip translations map to text selection via arrow keys, and wherein relaxed four-fingertip translations map to window panning or scrolling while spread four-fingertip leftward slides map to a cursor to beginning of line command, rightward slides map to a cursor to end of line command, upward slides map to the PageUp command, and downward slides map to the PageDown command.

9. The method of claim 1 wherein both file and application manipulation commands are packed into the multi-touch gesture mappings of one hand by mapping file manipulation commands to the relaxed, neutral version of a chord consisting of the thumb and a fixed number of fingertips, while mapping analogous application manipulation commands to performances of this chord that start with fingers spread.

10. The method of claim 9, wherein a clockwise rotation of the neutral chord fingers maps to the Close document command while a clockwise rotation of the spread chord fingers maps to the Exit application command, and a neutral counter-clockwise rotation maps to the Open document command while a spread counter-clockwise rotation maps to a command helpful in opening other applications.

11. The method of claim 9, wherein a contraction of the chord fingers starting from a relaxed posture maps to the Save document command while a contraction of the chord fingers starting from an outstretched posture maps to the Save As . . . document command, and wherein an expansion of the chord fingers starting from the relaxed posture maps to the New command while an expansion of the chord fingers starting from the outstretched posture maps to the Print command.

12. The method of claim 9, wherein a leftward slide of the relaxed chord fingers maps to a previous document or browse Back command while a leftward slide of the spread chord fingers maps to a switch to previous application command, and wherein a rightward slide of the relaxed chord fingers maps to a next document or browse Forward command while a spread rightward slide maps to a switch to next application command.

13. The method of claim 9, wherein a downward slide of the relaxed chord fingers maps to a document reload or refresh command while a downward slide of the spread chord fingers maps to an application window restore or minimize command, and wherein an upward slide of the relaxed chord fingers maps to a Parent irectory or browse Upward in a hierarchy command while an upward slide by spread fingers maps to an application window maximize command.

14. The method of claim 9, wherein the chord chosen for the document and application command gestures consists of the thumb and exactly three fingertips, and wherein to maximize gesture recognition accuracy, users are instructed to touch the surface with their thumb, index, middle, and ring fingers when performing the document manipulation gestures but touch their thumb, middle, ring and pinky fingers when performing application window manipulations.

* * * * *

UNITED STATES PATENT AND TRADEMARK OFFICE
CERTIFICATE OF CORRECTION

| | |
|---|---|
| PATENT NO. | : 7,030,861 B1 |
| APPLICATION NO. | : 10/065252 |
| DATED | : April 18, 2006 |
| INVENTOR(S) | : Wayne Carl Westerman and John G. Elias |

It is certified that error appears in the above-identified patent and that said Letters Patent is hereby corrected as shown below:

Column 16 on line 2:

"irectory" should be replaced with --directory--.

Signed and Sealed this

Fourth Day of July, 2006

JON W. DUDAS
*Director of the United States Patent and Trademark Office*